(12) United States Patent
Erickson et al.

(10) Patent No.: US 7,904,504 B2
(45) Date of Patent: Mar. 8, 2011

(54) POLICY ENFORCEMENT AND ACCESS CONTROL FOR DISTRIBUTED NETWORKED SERVICES

(75) Inventors: John S. Erickson, Norwich, VT (US); Mark Schlageter, Merrimack, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2287 days.

(21) Appl. No.: 09/984,969

(22) Filed: Oct. 31, 2001

(65) Prior Publication Data

US 2003/0084168 A1  May 1, 2003

(51) Int. Cl.
*G06F 15/16* (2006.01)
*G06F 15/173* (2006.01)

(52) U.S. Cl. .................. 709/203; 709/217; 709/223

(58) Field of Classification Search .................. 395/701; 707/103; 709/200, 217, 203, 216, 223
See application file for complete search history.

(56) References Cited

U.S. PATENT DOCUMENTS

| | | | | |
|---|---|---|---|---|
| 6,016,394 | A * | 1/2000 | Walker | 717/104 |
| 6,832,237 | B1 * | 12/2004 | Christensen et al. | 709/200 |
| 2001/0020228 | A1 | 9/2001 | Cantu et al. | |
| 2002/0013711 | A1 * | 1/2002 | Ahuja et al. | 705/1 |

FOREIGN PATENT DOCUMENTS

| | | |
|---|---|---|
| EP | 0 136 604 A2 | 9/1984 |
| EP | 0 240 363 A2 | 4/1987 |
| GB | 2 316 584 A | 2/1998 |

OTHER PUBLICATIONS

Henry M. Gladney, "Research Report Safe Deals Between Strangers" IBM Almaden Research Center , 1999, p. 1-10.*
Zagalo, H.T. et al., "Design and development of a virtual library and a SOAP/Z39.50 gateway using Java technologies," Java/Jini Technologies, Sudipto Ghosh, Editor, Proceedings of SPIE vol. 4521 (2001).

(Continued)

*Primary Examiner* — Karen C Tang (57) ABSTRACT

Apparatus for controlling cross-organizational access by end users associated with a plurality of organizations to one or more distributed object services available via a resource server across an information technology communications network. The apparatus comprises at least one Requesting Organization (RO) having access to services via the resource server, the Requesting Organization being adapted to issue enrollments to one or more end users upon request and electronically transmitting the enrollments to the respective end users. The apparatus further comprises at least one Servicing Organization (SO) communicating with the Requesting Organization and defining the credentials required for access to a service via the resource server by end users associated with each of the organizations. A Clearance Service (CS) is provided in which is stored one or more mappings of enrollments to credentials, the end user being adapted to transmit to the resource server a request for access to a resource together with data relating to their respective enrollment, in response to receipt of which request, the Requesting Organization is adapted to transmit the data relating to the enrollment to the Clearance Service which is adapted to map the enrollment to one or more respective credentials and return data representative of the credentials to the resource server which in turn is adapted to compare the data representative of the credentials to the original resource request and to comply (or otherwise) with the request. The Requesting Organization the resource server and the Clearance Service are all implemented as web or e-services.

17 Claims, 2 Drawing Sheets

OTHER PUBLICATIONS

John S. Erickson, "A Digital Object Approach to Interoperable Rights Management: Fine-grained Policy Enforcement enabled by a Digital Object Infrastructure," *D-Lib Magazine* (Jun. 2001) (to appear), pp. 1-17.

Clifford Lynch, "A White Paper on Authentication and Access Management Issues in Cross-organizational Use of Networked Information Resources," *Coalition for Networked Information*, (1998), pp. 1-22.

Sandra Payette and Carl Lagoze, "Flexible and Extensible Digital Object and Repository Architecture," *Second European Conference on Research and Advanced Technology for Digital Libraries*, Heraklion, Crete, Greece, Sep. 21-23, 1998 (Springer Lecture notes in computer science; vol. 1513, 1998), pp. 1-14.

Sandra Payette et al., "Interoperability for Digital Objects and Repositories: The Cronell/CNRI Experiments," *D-Lib Magazine* (May 1999) pp. 1-17.

Sandra Payette, Christophe Blanchi and Naomi Dushay, "Repository Access Protocol (RAP) IDL Version 1.3," pp. 1-9.

Sandra Payette and Carl Lagoze, "Policy-Carrying, Policy-Enforcing Digital Objects," *Fourth European Conference on Research and Advanced Technology for Digital Libraries, Portugal*, (Springer, 2000).

Robert Kahn and Robert Wilensky, "A Framework for Distributed Digital Object Services," (1995), pp. 1-12.

Henry M. Gladney and Arthur Cantu, Jr., "Safe Deals with Strangers: Authorization Management for Digital Libraries." To appear in Comm. ACM (Apr. 2001), pp. 1-5.

Henry M. Gladney, "Safe Deals between Stranger," *IBM Research Report RJ 10155*, (Jul. 1999), pp. 1-27.

E. Damiani et al., "Securing XML Document." *In Proc. of the 2000 International Conference on Database Technology (EDBT2000)*, Konstanz, Germany (Mar. 2000).

Michiharu Kudo and Satoshi Hada, "XML Access Control (Proposal)," *Tokyo Research Laboratory, IBM Research* (Oct. 2000), pp. 1-7.

Ernesto Damiani, et al "Fine Grained Access Control for SOAP E-Services," *In Proceedings of WWW10*, Hong Kong (May 2001), pp. 1-20.

* cited by examiner

POLICY ENFORCEMENT AND ACCESS CONTROL FOR DISTRIBUTED NETWORKED SERVICES

FIELD OF THE INVENTION

This invention relates generally to policy enforcement and access control mechanism for highly distributed networked services and, more particularly, to a method and apparatus for controlling access to and protecting networked information resources and services, including individual or sets of "web services" or "e-services" made available by hosts via message calls across network protocols.

BACKGROUND TO THE INVENTION

Generally, a web service or e-service may be considered as a set of network endpoints operating on messages containing either document-oriented or procedure-oriented information. Web services are explicitly specified by web service descriptions, in which operations and messages are described abstractly and bound to a concrete network protocol and message format to define an endpoint. Related concrete endpoints may be combined into abstract endpoints (or services), and various message transport protocols are appropriate, including especially HTTP and SMTP.

The global information network is a network of intellectual property. All information made accessible on such a network has been disseminated within some sort of Intellectual Property Rights (IPR) context, in which relationships between information objects and parties (such as creators, publishers and consumers) have been defined in some specific way, either implicitly or explicitly. The manifestation of those relationships in terms of specific objects, parties and actions can be thought of as IPR policies.

Considerable research is currently being carried out with regard to the provision of a consistent mechanism for the expression of IPR policies on the Internet and similar digital, networked environments, and to the provision of ways for information consumers (or agents operating on their behalf) to easily and automatically discover, access and interpret such policies for information of interest. The quality of such networked environments suffers by not having an open and accessible way to persistently associate IPR policies with information objects, both before and after their dissemination.

The present invention is concerned particularly, but by no means exclusively, with providing access control and policy enforcement for web services that disseminate aspects of heterogeneous information objects, especially services that provide different content types (for example, MIME types) and/or transformations (for example, language translations). However, because the network interfaces of interest are generally programmatic by design, the present invention may be applied more generally to any remote method invocation, including, for example, access to sensitive material and information such as portions of business documents that may have been modelled as distributed objects.

PRIOR ART

As institutions implement networked information strategies which call for sharing and licensing access to information resources in the networked environment, authentication and access management have emerged as major issues which have threatened to impede progress in this area. Considerable work has been carried out in recent years in connection with authentication within institutions and, more recently, in support of consumer-oriented electronic commerce on the Internet, as a result of which a series of new technical and policy issues have emerged in the context of cross-organisational authentication and access management.

The cross-organisationial access management problem is defined in Clifford Lynch, "A White Paper on Authentication and Access Management Issues in Cross-Organisational use of Networked Information Resources", Coalition for Networked Information, (1998), in which it is stated that the basic cross-organisational access management problem is exemplified by most licensing agreements for networked information resources today; it also arises in situations where institutions agree to share limited-access resources with other institutions as part of a consortia or other resource sharing collaborations. In such an agreement, an institution such as a university, school, public library, corporation, etc. defines a user community which has access to some network resource. Such a community is typically relatively large, often numbering in the thousands or tens of thousands of individuals, and membership may even be volatile over a period of time. The operator of the network resource, which may be a web site or the like, needs to decide whether users seeking access to the resource are actually members of the user community that the licensee institution defined as part of the license agreement.

It is important to note that the issue here is not how the licensee defines the user community as it can be assumed that the institution and the resource operator have reached a satisfactory resolution in this regard. Rather, the issue is one of testing or verifying that individuals are really members of the defined user community according to the pre-agreed criteria, i.e. the issue can be considered to be one of having the institution vouch for the individuals in some way that the resource operator can understand.

One of the most basic ways in which attempts have been made to deal with these issues has been the provision of simple access control lists, i.e. the resource operator is provided with and holds a list of all individuals (or groups of individuals) who are to be permitted access to the resource(s) in question, and/or role-based solutions (which involve only one level of indirection). However, such solutions are difficult to scale for large and diverse user bases as they rely on a centralised administration of credentials.

In any event, it is clear from the Lynch reference that the administration of credentials in a trust network must be highly decentralised, with trust relationships established in a pairwise fashion, to solve the problems of scaling across and beyond organisational boundaries. Institutions such as universities, corporations and professional societies must be free to manage their members as they see fit, and service agreements that they establish for web services (content or other resources) should be expressed in terms of these groupings, rather than in terms of specific members. Furthermore, suppliers of web services and the like must be able to manage access credentials for their resources independently of any specific membership groupings that may be named in agreements and thus indirectly "bound" to resources. Finally, privacy requirements suggest that optimally, the identities of individual requestors of resources should be opaque to resource suppliers.

In general, session-based access control for services is not appropriate for asynchronous message-based method (service) invocation, and acceptable solutions are required to deal with individual requests as "atoms", and therefore should package credentials as parameters or attributes of individual requests. Further, solutions must be scalable to highly parallel, queued message-handling environments, which further suggests an atomic approach.

An improvement on these approaches, which was motivated by the Lynch reference, is discussed in Henry M. Gladney, "Safe Deals Between Strangers", IBM Research Report RJ 10155, (July 1999) and Henry M. Gladney & Arthur Cantu, Jr., "Safe Deals with Strangers:Authorisation Management for Digital Libraries", Comm. ACM (April 2001). The "safe dealing" trust management approach proposed in these references addresses the cross-organisational authentication and access control problem. The above-referenced document states that prior approaches to trust establishment are based on two assumptions which are considered to be too strong for many situations, the two assumptions being a) that trust between negotiating entities requires that each know the identity of the other, and b) that, in a hierarchy of certifying authorities, they have a common ancestor. The contribution made by the "Safe Dealing" trust management approach is simply to relax these assumptions and apply well-known techniques to reliably establish the mutual trust two entities need to strike a deal.

The 'Safe Dealing' model proposed by Gladney will now be explained in more detail A Requesting Organisation (RO) chooses to issue credentials to members of its population, certifying the membership of the bearer (end user or EU) to various degrees of affiliation, structured in whichever manner the RO feels is appropriate. Examples of this structuring might include "EnormousStateU_student", "EnormousStateU_gradStudent", EnormousStateU_EngrStudent", EnormousStateU_engrFaculty", etc. Individual RO's are free to apply these credentials (enrollments) in a variety of ways, including using them as a basis for members of their community to access resources and services that the RO licenses from external providers.

Service Organisations (SO) separately decide how they wish to make their resources available. They define access control policies for the individual resources or collections of resources that they may want to make available on their partner Resource Servers (RS). These policies specify the actions that the RS should take upon receipt of the specified credentials (tickets). These credentials are inherently different to the credentials created by the RO, which is an essential point.

Pairs of RO's and SO's complete licensing deals (Service Agreements or SA's) that govern access to resources. Functionally, these service agreements contain the mappings between the RO enrollments and RS tickets. When resolved, these mappings enable users with a particular affiliation within the RO to obtain whatever access to resources that the tickets provide (through mappings held by the RS). It is worth noting the trust pairings: the RO manages its user-enrollment mappings and the RS administers the ticket-resource (or privilege) mappings. The enrollment-ticket mappings are stored in the trusted third party, known in the safe dealing model as the "clearance centre" (CC).

In practice, enrollments are included as part of the EU's resource request. The enrollment is readable only by the CC to be resolved for its ticket. The CC sends the appropriate ticket, readable only by the RS. Finally, the RS verifies that the ticket is sufficient for the action on the resource that the EU has requested. The results of the resource request might be readable only by the EU.

Thus, the safe dealing model provides substantial improvements over the previously-proposed simple access control solutions in that it provides a pair-wise mapping of credentials, provides an additional level of indirection (which is highly suited for cross-organisational application), and provides the additional benefit of inherent preservation of privacy because the indirection ensures that minimum information is divulged at each level s that collusion is virtually impossible.

It is beyond the scope of this specification to discuss the Gladney safe dealing model in any further detail, although further details of the proposed protocol and its suggested implementation are given in the above-referenced documents.

However, the Gladney safe dealing trust management approach only generally addresses the cross-organisational authentication and access control problem. For example, it only refers in generic terms to "resources" or "privileges" with no specific reference being made or consideration being given (among other things) to interaction of the various applications with each other and/or other applications across an information technology communications network, such as the Internet. Further, little if any consideration is given to the fine-grained policy enforcement often required in digital, networked environments. Thus, the present invention is intended to provide a number of improvements over the Gladney safe dealing model.

SUMMARY OF THE INVENTION

Thus, in accordance with a first aspect of the present invention, there is provided apparatus for controlling cross-organisational access by end users associated with a plurality of organisations to one or more distributed object services available via a resource server across an information technology communications network, the apparatus comprising at least one authorisation module associated with each organisation having access to services via said resource server, said authorisation module being adapted to issue enrollments to one or more end users upon request and electronically transmit said enrollments to the respective end users, at least one servicing module communicating with said resource server and defining the credentials required for access to a service via said resource server by end users associated with each of said organisations, and a clearance module in which is stored one or more mappings of enrollments to credentials, the end user being adapted to transmit to the resource server a request for access to a resource together with data relating to their respective enrollment, in response to receipt of which request, said resource server is adapted to transmit said data relating to said enrollment to said clearance module, said clearance module being adapted to map said enrollment to one or more respective credentials and return data representative of said credentials to said resource server, said resource server being further adapted to compare said data representative of said credentials to said original resource request and to comply (or otherwise) with said request, said authorsation module, said resource server and said clearance module being implemented as applications or endpoints which can dynamically interact with other applications or endpoints across an information technology communications network.

Also in accordance with the first aspect of the present invention, there is provided a method for controlling cross-organisational access by end users associated with a plurality of organisations to one or more distributed object services available via a resource server across an information technology communications network, the method comprising the steps of providing at least one authorisation module associated with each organisation having access to services via said resource server, said authorisation module being adapted to issue enrollments to one or more end users upon request and electronically transmit said enrollments to the respective end users, at least one servicing module communicating with said resource server and defining the credentials required for access to a service via said resource server by end users associated with each of said organisations, and a clearance module in which is stored one or more mappings of enrollments to credentials, the end user transmitting to the resource server a request for access to a resource together with data relating to their respective enrollment, in response to receipt of which request, said resource server transmitting said data relating to said enrollment to said clearance module, said clearance module being adapted to map said enrollment to one or more respective credentials and return data representative of said credentials to said resource server, said resource server then comparing said data representative of said credentials to said original resource request and to complying (or otherwise) with said request, said authorisation module, said resource server and said clearance module being implemented as applications or endpoints which can dynamically interact with other applications or endpoints across an information technology communications network.

Thus, the first aspect of the present invention essentially applies the safe dealing principle to access control for e-services and web services which are, or may be under certain circumstances, available to end users cross-organisationally, essentially to strangers.

In a preferred embodiment of the first aspect of the present invention, the authorisation module, resource server and clearance module, which are implemented as "web" or "e-services" (i.e. applications or endpoints which can dynamically interact with other applications or endpoints across an information technology communications network), may be accessible via an object invocation protocol, preferably the SOAP object invocation protocol or the like.

In accordance with a second aspect of the present invention, there is provided apparatus for policy enforcement for distributed object services and/or resources accessible across a communications network, the apparatus comprising a resource server for providing access by an end user to said object services and/or resources, data structure creation apparatus for creating a policy data structure defining one or more policies in accordance with which access to said service and/or resource is permitted by said end user, and binding apparatus for binding said policy data structure to said object service and/or resource.

Also in accordance with the second aspect of the present invention, there is provided a method of policy enforcement for distributed object services and/or resources accessible across a communications network, the method comprising the steps of providing a resource server for providing access by an end user to said object services and/or resources, creating a policy data structure defining one or more policies in accordance with which access to said service and/or resource is permitted by said end user, and binding said policy data structure to said object service and/or resource.

The policy data structure binding concept of the second aspect of the present invention is beneficially applied to the arrangement defined by the first aspect of the present invention and, in a preferred embodiment of the invention, the policy data structure binds said credentials defined by said servicing module and stored by said clearance module to specific actions.

The policy data structure may be a relational database, or a structured text file (such as an XML file or the like), for example. The policy data structure may define one or more policies associated with a particular service and/or a particular end user, the or each of said policies comprising a dataset having defined therefor at least an object:subject:action triple. In a preferred embodiment, the object may comprise a key or other data representative of the service being requested by an end user, the subject may comprise a key or other data representative of said one or more credentials associated with said end user, and the action may specify one or more actions to be taken by the resource server in the event that said object and said subject match. The action may comprise either acceptance or denial of the request for the service. In another embodiment, the action may comprise one of acceptance, denial or filtered (or conditional) acceptance. In yet another embodiment of the invention, the possible action(s) may comprise or include redirection to another service endpoint and/or the passing of parameters from the original service call to subsequent service calls. Further, the apparatus may be arranged such that completion of one or more specified actions gives rise to the requirement for and/or completion of one or more further actions.

The apparatus and method of the second aspect of the present invention may be applied specifically to digital information objects. In any event, the information or service objects may include data representative of the policy data structure (or policy expressions) directly therein, or they may just contain one or more references thereto.

BRIEF DESCRIPTION OF THE DRAWINGS

An embodiment of the present invention will now be described by way of example only and with reference to the accompanying drawings, in which.

DETAILED DESCRIPTION OF THE INVENTION

Thus, as established above, the important contribution of the Gladney safe dealing model is that it provides one way to establish trust relationships between pairs of entities as appropriate without propagating extraneous details that might lead to privacy and/or liability issues. The resulting web of relationships end up being managed at peer level, resulting in a naturally scalable trust infrastructure.

Figure 1:
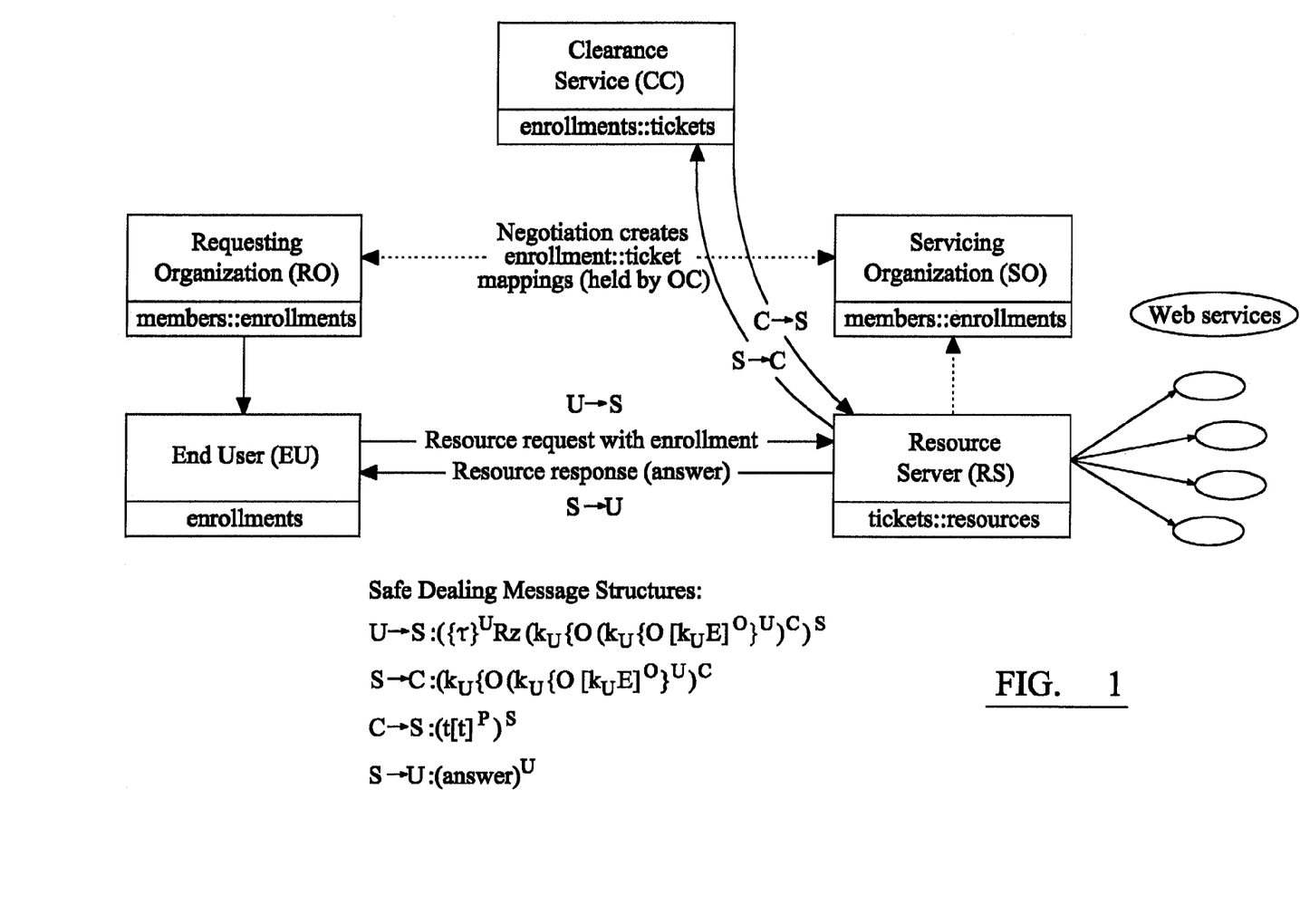
FIG. 1 is a schematic block diagram illustrating the Safe Dealing Trust Establishment Model applied to web or e-services, in accordance with an exemplary embodiment of the first aspect of the present invention.

The underlying concept of an exemplary embodiment of the first aspect of the present invention, as illustrated in FIG. 1 of the drawings, is the specific application of the safe dealing model to web services. Although the manner in which the various services communicate in the model illustrated by FIG. 1 is substantially the same as that described with reference to the Gladney safe dealing model, it differs in that each of the critical services (RS, RO and CC) are implemented as web services, beneficially accessible via the SOAP object invocation protocol. Further, an important feature is the inclusion of the enrollment as a parameter in the resource request (i.e. the web server request to the RS).

Thus, referring in particular to FIG. 1 of the drawings, A Requesting Organisation (RO) issues enrollments (E) to members of its community, certifying the membership of the bearer (end user, or EU) to various degrees of affiliation, structured in whatever manner the RO feels is appropriate. Examples of this structuring might include "EnormousStateU_student", "EnormousStateU_gradStudent", "EnormousStateU_engrStudent", "EnormousStateU_engrFaculty", etc., as before. Individual RO's are free to apply these enrollments in any way they see fit, including using them as a basis for members of their community to access resources and services that the RO licenses from external providers.

Service Organisations (SO) separately decide how they wish to make their resources available. They define access control policies for the individual resources or collections of resources that they may want to make available on their Partner Resource Servers (RS). These policies specify the actions that the RS should take upon receipt of the specified credentials (tickets). These credentials are inherently different from the credentials created by the RO, which is an essential point.

Pairs of ROs and SOs complete service agreements (SA), for example, licensing deals, which govern how the RO's membership may access the SO's resources. Functionally, the SA contains mappings between the RO enrollments and RS tickets. When resolved, these mappings enable users with a particular affiliation within the RO to obtain whatever access to resources that the tickets provide (through policy mappings held by the RS). Note once again the trust pairings: the RO manages user-enrollment mappings, the RS administers ticket-resource (or privilege) mappings. Enrollment-ticket mappings are stored in the trusted third party (or clearance centre CC).

In practice, enrollments are included as part of the EU's resource request. The enrollment is readable only by the CC (encrypted to its public key). Upon receipt of the enrollment, the RS sends the enrollment to the CC to be resolved for its ticket. The CC sends the appropriate ticket, readable only by the RS (encrypted to its public key). Finally, the RS verifies that the ticket is sufficient for the action on the resource that the EU has requested. Once again, the results of the resource request might only be readable by the EU.

A second aspect of the present invention provides for the binding of policies to individual object services, and this aspect of the present invention will now be described in more detail. Robert Kahn and Robert Wilensky propose in "A Framework for Distributed Digital Object Services" (1995), to define the components of an open system for storage, access, dissemination and management of information in the form of digital objects.

As explained above, a resource server (RS) makes a set of services available (which may be any sort of service; a specific approach for information objects is outlined in more detail below). According to the safe dealing model, RS must maintain a "mapping" of tickets to resources. In this exemplary embodiment of the present invention, this is a policy data structure that binds tickets to specific actions. This data structure might be a table in a relational database, or a structured text file (for example, an XML file). Every policy in this structure at least comprises an object:subject:action triple, where the 'object' is some key that represents to the interpreter the service being requested; the 'subject' is a key that represents a ticket that the RS may recognise as a credential; and the 'action' specifies some action that the RS should take, given a match between the object and the subject.

In one form, 'action' maybe simple approval (or specific denial) of the request for the service. In another form, 'action' is another service endpoint, supplied locally or remotely; implementation of authorisation is then a matter of filtering or re-direction. Actions may be complex, or 'chained. Finally, actions might be written in such a way as to pass parameters from the original service call to subsequent service calls (the benefit of parameterisation of the credentials being that calls remain atomic and independent of transport.

Finally, the system of policy expression provided by the present invention can be extended to support sequences of authorised activities. The completion of activities can result in the dynamic (programmatic) addition or validation of policies for other subsequent services to be accessed within the workflow. Specifically, part of the policy "action" would be to fire an event or notification which causes the validation of the policies that will subsequently be needed. This technique supports queued processing environments where access to subsequent process steps may require the completion of one or more previous process steps.

A digital object is a content-independent package that includes, for example, the content of a work, a unique identifier for the digital object (its 'handle'), and other data about the object, which might include policy expressions dictating use of the object. Repositories logically store digital objects and are responsible for enforcing policies bound to aspects of their resident objects. A service request on a digital object produces a dissemination, which contains the results of the request (determined by the parameters in the request) and additional data specifying the origin of the dissemination and the specific policies governing its use. It will be appreciated that disseminations are not required to have the same data as the underlying "source" digital object, and nor does a dissemination need to be some subset of the digital object's data (e.g. a digital object that is the result of a service request for a single page of a book stored as a digital object). For example, a digital object may be an executable program and disseminations may be produced by running the program using the parameters in the service request as input.

Finally, the Kahn/Wilensky reference outlines a Repository Access Control (RAP) that provides services for depositing and accessing digital objects, and an implementation of RAP will be discussed later as an approach to binding policies to object services in accordance with an exemplary embodiment of the second aspect of the present invention.

The fine-grained function or behaviour of an objects content-type disseminator must be dependent upon policies. The present invention considers the binding of a particular policy or set of policies to individual object services or information objects, and, whether we are talking about viewing content or executing a remote method, it comes down to the issue of access control. Thus, it will be clear that method calls to disseminators.

Given all of the interested parties that will at one point or another obtain access to object services or the services of an information object (for "content" or "metadata"), it is obviously impossible to centrally manage access control policies and the credentials that would be bound to them. There is therefore a critical need for an authentication model that provides multiple levels of indirection, allowing trust relationships to be established in a pair-wise, peer-oriented fashion, as provided by the Gladney Safe Dealing model described above. The present invention improves on this model by providing policy expression and enforcement at an appropriate level of granularity.

In general, policy expression concerns the creation of triples relating subjects, objects and actions, where in this context a subject can be (loosely) thought of as a requester for a service, an object can be thought of as a specific service (or behaviour) of an information object, and an action as some permissible action (note that sometimes the "action" may be implicit, in which case the policy would simply specify a "sign" signifying the authorisation state).

Subjects referenced by a policy would depend upon how we implement authorisation (i.e. credentials) in the application; a subject reference could specify some verifiable personal identifier, or preferably a credential such as a ticket described in the safe dealing model (described above). Objects would comprise anything to which a unique name can be verifiably fixed, and need not be limited to coarse-grained "aspects" of an object (e.g. whether a subject can get access to a RAP-defined service at all) but may be fine-grained methods or behaviours of content types as well. Actions might implement simple authorisation (e.g. allow/disallow), somewhat more complex consequences (e.g. allow/disallow/allow filtered), or a cascade of actions (e.g. firing an event to some notification service, in addition to basic response actions).

The safe dealing model accommodates the transfer of credentials, but not the actual policies that have been expressed in terms of the credential (in the case of safe dealing, tickets). The technique for managing the mapping between credentials and policies would likely vary between RAP hosts, but in accordance with this aspect of the present invention must semantically be the same if they expect to honour the same policies. From an implementation standpoint, the object service provider would typically treat enforcement as a filter-like function, whereby the service's remote service call gateway (e.g. a SOAP gateway) would need to decide whether to pass through a request, based upon the rule that applies for the subject:object:action (where subject is the uniquely-identified credential, in this case the ticket; object is the specific RAP method request or part of the request; and action is one of a number of enumerated outcomes—see Ernesto Damiani, et al., "Fine Grained Access Control for SOAP E-services", in Proceedings of WWW10, Hong Kong [May 2001].

The Repository Access Protocol (described in Sandra Payette et al., "Interoperability for Digital Objects and Repositories: The Cornell/CNRI Experiments", D-lib Magazine [May 1999], and in Sandra Payette, Christophe Blanchi and Naomi Dushay, "Repository Access Protocol (RAP) IDL Version 1.3", is a robust interface that provides distributed access and management over digital information objects and repositories. Specifically, RAP provides a set of mechanisms to create, delete and edit digital objects as well as to operate on their properties, data and behaviours. Because RAP specifies a consistent way to access and maintain digital objects regardless of their application, it can be introduced as a key defining element of the digital object infrastructure.

RAP can be broken into four main parts or classes, corresponding to the major components of the Kahn/Wilensky model: The Repository, the Digital Object, the Disseminator and the Datastream. The repository class provides the functionality to create, delete and administer the digital object contained within a particular system. Clients wishing to interact with a specific digital object must first locate the repository that contains that object (by means of an object naming infrastructure such as a Handle System, perhaps using a Digital Object Indentifier (DOI)), and then initiate a RAP "connection" with that repository. Once connected, the client then requests the digital object from the repository. In a preferred embodiment of the invention, RAP requests are made via a message-based object invocation protocol, especially SOAP—see, for example, Ernesto Damiani, et al., "Fine Grained Access Control for SOAP E-Services" referenced above.

When considering how to map policies to object services, it is important to recall that RAP defines the primary interface to the digital object. Thus all policies, whether they apply to primary RAP components or content types must be in terms of the digital object. Every instance of the three primary classes defined by RAP (Digital Object, Disseminator and Datastream) has associated with it a set of RAP methods; each method may be the object of one or more policies, associating actions (like "accept") with credentials. Finally, every object may encapsulate multiple content-types, each of which is defined by a set of methods, where each method may be the object of one or more policies.

From a practical standpoint, the most important requirement is that these policy expressions be done explicitly; hard coded implementations are possible and fall within the scope of the present invention, but can be limited in their flexibility and are therefore not generally recommended. Mechanisms for mapping policies to methods might include (1) expressing policies in declarative structures that are referenced by the method; or (2) policy objects are referenced by the method and asked to evaluate. It is worth noting that option (1) would most likely be implemented as a data stream and would be sourced by a unique object. The difference between the two approaches is that, instead of evaluating the policy and returning the result to the calling method, the object would supply the fill policy declaration that would be the basis for an evaluation by another object.

Thus, each disseminator-level method call (for example, "GetPDFPage(45)") would minimally have a policy data structure associated with it, and maximally would reference a policy object that would supply a result. In the case of the former, its content would have to be content-type specific. Its association with the information object could be either explicit or implicit (because it is just another datastream within the structure of the object).

Several options exist for "positioning" the policy data stream within the object hierarchy. For example, it may be preferred to include policy expressions directly or by reference (since we can assume each to be uniquely identified) within the structure of the object. Alternatively, it may be preferred to manage all of the policies for an object as a separate information object with its own services, although in some cases it is advantageous to include the policy expressions directly within the structure of the object. This issue may be resolved by invoking content-type equivalence, as discussed in Sandra Payette & Carl Lagoze, "Flexible and Extensible Digital Object and Repository Architecture", Second European Conference on Research and Advanced Technology for Digital Libraries, Heraklion, Crete, Greece.

Figure 2:
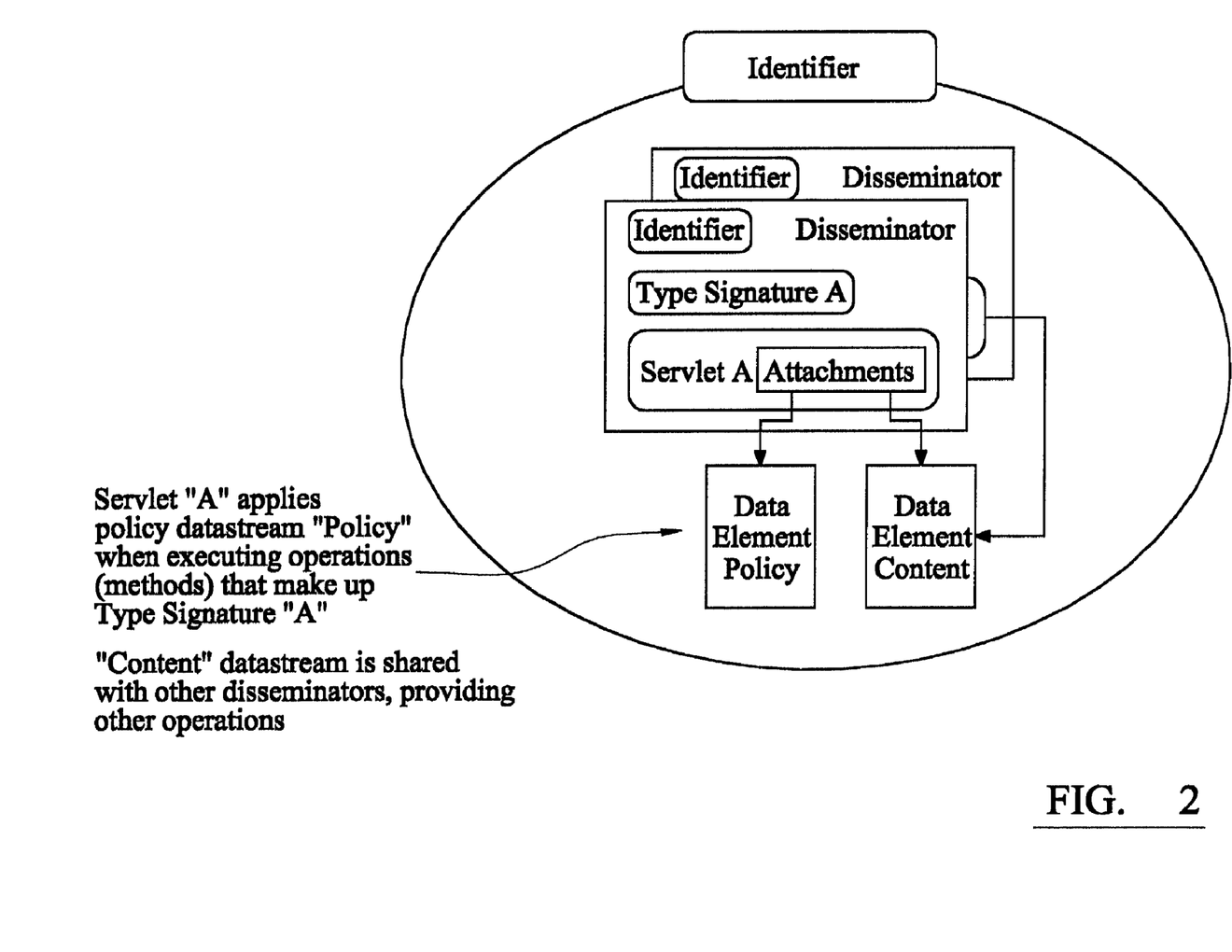
FIG. 2 is a schematic block diagram illustrating the binding of a policy data stream to an object service, in accordance with an exemplary embodiment of a second aspect of the present invention.

In the example illustrated by FIG. 2 of the drawings, the policy expression is included directly as a data stream within the structure of the object, and Servlet "A" applies policy datastream "Policy" when executing operations (methods) that make up Type signature "A". The "Content" data stream on the other hand is shared with other disseminators, providing other operations.

The safe dealing trust management approach proposed by Gladney generally addresses the cross-organisational authentication and access control problem. The present invention offers several improvements on Gladneys approach. For example, in the Gladney reference, "resources" and "privileges" are only referred to in generic terms, and no specific reference is made to web services as they are defined and applied in one aspect of the present invention. Further, Gladney makes no specific reference to the binding of richly-expressed policies to tickets, even though "privileges" are generally mentioned.

Thus, in summary, the Gladney safe dealing model coupled with a flexible means of expressing policies for web service requests, provides a powerful and uniform way to manage digital objects within the repository as well as in the dissemination of content, and to apply policy enforcement at appropriate levels. Further, the present invention is essentially independent of transport protocol: prior solutions bind control into transport, whereas the approach used in the present invention allows a credential to be presented as a parameter in a method call, thereby allowing the propagation of requests in any suitable transport format. In addition, authorisation (or policy enforcement) is independent of the physical locality of the requestor (unless such locality is a condition of enrollment in the first place).

Finally, the present invention enables the provision of format-specific digital rights management. Most prior art digital rights management approaches tightly bind the media format, the packaging method and a proprietary trust management solution. Typically, a publisher or information provider is not free to choose the dissemination format or formats for their content. If they choose to disseminate multiple types, it is often necessary to deploy their content using multiple rights management technologies. On the other hand, the present invention, when applied to the dissemination of information, allows credentials to be applied uniformly across dissemination formats. It allows fine-grained policy management over all aspects of an information object across organisational boundaries, allowing a single abstract representation of an information object to be used throughout the object's production, distribution, consumption and long-term archiving.

In the foregoing specification, the invention has been described with reference to specific exemplary embodiments thereof. It will, however, be apparent to a person skilled in the art that various modifications and changes may be made thereto without departing from the broader spirit and scope of the invention as set forth in the appended claims. Accordingly, the specification and drawings are to be regarded in an illustrative, rather than a restrictive, sense.

The invention claimed is:

1. An apparatus for controlling cross-organizational access by end users associated with a plurality of organizations to one or more distributed object services and/or resources available via a resource server across an information technology communications network, the apparatus comprising:
   an authorization module associated with each of said organizations, said authorization module being adapted to issue enrollments to one or more end users associated with said organization and electronically transmit said enrollments to the respective end users;
   a servicing module for defining credentials required for access to each of said services and/or resources via said resource server by end users associated with each of said organizations; and
   a clearance module storing one or more mappings of enrollments to credentials, wherein at least one of the authorization module, the resource server and the clearance module is arranged to be accessible via an object invocation protocol;
   wherein each of the end users includes a transmitter for transmitting to the resource server a request for access to at least one of said services and/or resources together with data relating to the respective enrollment of the end user;
   in response to receipt of said request, said resource server is adapted to transmit said data relating to said enrollment to said clearance module;
   said clearance module is adapted to map said enrollment to one or more respective credentials and return data representative of said credential(s) to said resource server;
   said resource server is adapted to comply with said request in response to a positive comparison of said data representative of said credential(s) to said request and to deny said request in response to a negative comparison of said data representative of said credential(s) to said request; and
   at least one of said authorization module, said servicing module, and said clearance module is/are applications or endpoints dynamically interactable with other applications or endpoints across the information technology communications network.

2. An apparatus according to claim 1, further comprising a policy enforcement apparatus for policy enforcement for said distributed object services and/or resources, the policy enforcement apparatus comprising:
   a policy data structure creating apparatus for creating a policy data structure defining, for each of said object services and/or resources, at least one policy in accordance with which access to said object service and/or resource is permitted by an end user; and
   a binding apparatus for binding said at least one policy defined by said policy data structure to said object service and/or resource;
   said policy enforcement apparatus being configured to cause said resource server to provide access by the end user to said object service and/or resource upon a determination that the end user's request for said object service and/or resource satisfies said at least one policy bound to said object service and/or resource.

3. An apparatus according to claim 2, wherein said at least one policy comprises a data set having defined therefor at least an object-subject-action triple, and wherein
   the object comprises data representative of the service and/or resource being requested by the end user;
   the subject comprises the data representative of the credentials associated with said end user and returned from said clearance module; and
   the action specifies one or more actions to be taken by the resource server in the event said object and said subject match.

4. An apparatus according to claim 1, wherein said clearance module is a trusted party remote from said end users and said resource server and is communicable with said resource server via said information technology communications network.

5. An apparatus according to claim 1, wherein the mappings of enrollments to credentials stored in said clearance module are part of a service agreement between said resource server and the organization with which said end users are associated.

6. An apparatus according to claim 5, wherein the service agreement is established as a result of negotiations between said servicing module and the authorization module associated with said organization.

7. An apparatus according to claim 1, wherein
   the data relating to the enrollment of the end user being transmitted with the request is encrypted to be readable only by the clearance module;
   the data representative of the credentials returned from the clearance module to said resource server is encrypted to be readable only by said resource server; and
   a response of the resource server to the request is encrypted to be readable only by said end user.

8. An apparatus according to claim 1, wherein said at least one of the authorization module, resource server and clearance module is a web service.

9. An apparatus for policy enforcement for distributed object services and/or resources accessible across a communications network, the apparatus comprising:

a resource server for providing access by an end user to said object services and/or resources;

a policy data structure creating apparatus for creating a policy data structure defining, for each of said object services and/or resources, at least one policy in accordance with which access to said object service and/or resource is permitted by said end user; and a binding apparatus for binding said at least one policy defined by said policy data structure to said object service and/or resource.

10. An apparatus according to claim 9, wherein said policy data structure is a relational database.

11. An apparatus according to claim 9, wherein said at least one policy comprises a data set having defined therefor at least an object-subject-action triple.

12. An apparatus according to claim 11, wherein the object comprises a key or data representative of the service and/or resource being requested by an end user;

the subject comprises a key or data representative of one or more credentials associated with said end user; and the action specifies one or more actions to be taken by the resource server in the event said object and said subject match.

13. An apparatus according to claim 12, wherein said action comprises acceptance or denial of the request for the service and/or resource.

14. An apparatus according to claim 12, wherein the action comprises one of acceptance, denial, filtered acceptance, or conditional acceptance of the request for the service and/or resource.

15. An apparatus according to claim 12, wherein the action (s) includes redirecting to another service end point and/or passing of parameters from the original service call to subsequent service calls.

16. An apparatus according to claim 12, wherein the apparatus is arranged so that in response to completion of one or more specified actions, one or more further actions is performed.

17. A method of policy enforcement for distributed object services and/or resources accessible via a resource server across a communications network, the method comprising:

creating a policy data structure defining, for each of said object services and/or resources, at least one policy in accordance with which access to said service and/or said resource is permitted by an end user;

binding said at least one policy defined by said policy data structure to said object service and/or resource; and causing said resource server to provide access by the end user to said object service and/or resource upon a determination that the end user's request for said object service and/or resource satisfies said at least one policy bound to said object service and/or resource.

* * * * *

UNITED STATES PATENT AND TRADEMARK OFFICE
CERTIFICATE OF CORRECTION

| | | |
|---|---|---|
| PATENT NO. | : 7,904,504 B2 | Page 1 of 1 |
| APPLICATION NO. | : 09/984969 | |
| DATED | : March 8, 2011 | |
| INVENTOR(S) | : John S. Erickson et al. | |

It is certified that error appears in the above-identified patent and that said Letters Patent is hereby corrected as shown below:

In column 11, lines 40-41, in Claim 1, delete "organizations ," and insert -- organizations, --, therefor.

In column 14, line 6, in Claim 15, delete "end point" and insert -- endpoint --, therefor.

Signed and Sealed this
Twentieth Day of September, 2011

David J. Kappos
*Director of the United States Patent and Trademark Office*